Patented Aug. 1, 1950

2,517,014

UNITED STATES PATENT OFFICE 2,517,014

PLASTICS MOLDING COMPOSITIONS

William P. Miller and Stephen D. Ransburg, Indianapolis, Ind., assignors to Radio Corporation of America, a corporation of Delaware No Drawing. Application August 6, 1946, Serial No. 688,704

5 Claims. (Cl. 260—27)

This invention relates to compositions adapted to be moulded into shaped articles with the application of heat and pressure. Although adapted to be moulded into articles of almost any shape which may serve a variety of useful or ornamental purposes, the compositions are especially useful for making sound records such as, for example, disc phonograph records.

Moulded records have been commercially produced in the past from compositions which consisted essentially of shellac and filler. Moulded records have also been made from synthetic vinyl resins. The only one of the vinyl resins, however, which has proved commercially successful for this purpose is that of the copolymer type containing polyvinyl chloride and acetate although laminated records and surface coated records of other vinyl resins have been proposed.

One object of the present invention is to provide moulding compositions for making plastic articles in general and phonograph records in particular in which the resinous ingredients comprise polyvinyl acetate and a softer grade of thermoplastic resinous material.

Another object is to provide moulding compositions comprising polyvinyl acetate and shellac.

Another object is to provide moulding compositions comprising polyvinyl acetate and at least one other thermoplastic resin which has moulding properties similar to shellac.

Another object is to provide moulding compositions in which polyvinyl acetate is combined with shellac and another thermoplastic resinous material which is highly fluid when molten.

Another object is to provide moulding compositions especially suitable for making phonograph records having a novel surface anti-friction compound.

Still another object is to provide moulding compositions which can be used to produce articles having a marked increase in strength as compared to articles moulded from essentially shellac compositions.

These and other objects will be apparent from the description of the invention which follows but it is not desired to limit the invention except as defined in the appended claims.

The essential ingredients of the compositions made according to the present invention are polyvinyl acetate and another thermoplastic resinous material which must be highly fluid when molten and which should have a softening point as measured by the well known ball and ring method of about 75° C. to 170° C. The second type of resinous material may comprise one or more of a large number of materials having physical properties falling within the range specified. Some of the materials which have been tested and found suitable are rosin, rosin esters, hydrogenated rosin, pitches derived either from wood tar or coal tar, asphalts including gilsonite, and various synthetic resins. Among these latter is a product derived from pine stump distillate which is more specifically described as a resinous residue made by the process which comprises, (1) extracting pine wood with a coal tar hydrocarbon, (2) evaporating the coal tar hydrocarbon and other volatile constituents of the extract from the extract to produce a solid residue, (3) extracting rosin from said residue with a light petroleum hydrocarbon, (4) separating the rosin extract from the remaining residue which is substantially insoluble in light petroleum hydrocarbons, and (5) recovering the remaining resinous residue, coumarone-indene resins, and phenolic resins in the still fusible A or B stages. These resins are only a few examples of the many possibilities. Shellac, itself, may be used, preferably along with another resin of the group.

With these resinous ingredients, it is preferred to use at least 45 percent of a filler in order to make articles having adequate strength and rigidity. This filler may be selected from a large number commonly used in moulding compositions. For example, if the compositions are to be used to make phonograph records, it is preferred to use finely powdered mineral products such as limestone or slate flours, powdered silica, diatomaceous earth, or clays. There may also be used relatively smaller percentage of fibrous fillers such as cellulosic flocks including cotton flocks, or mineral fibers such as those made of asbestos, mineral wool, or glass. For general purpose moulding powders higher percentages of the fibrous materials may be used or wood flour may be substituted.

Since the compositions are to be used as moulding powders, it is desirable, although not absolutely necessary, to use a mould lubricant. This may be a metallic soap such as zinc stearate. Any metallic soap of one of the long chain fatty acids may be used or the fatty acid, itself may be utilized.

When used for record compositions, another type of lubricant is desirable. This will be identified as a record surfacing anti-friction compound in order to distinguish it from the mould lubricant. This compound serves to reduce surface friction between the record groove and the playing needle and reduces wear on the playing surface to a marked degree. Materials found useful for this purpose include the hard waxes, either natural, such as montan, ceranova or carnauba, or synthetic, such as a modified fatty acid ester or a microcrystalline hydrocarbon wax. The chemical composition of the wax makes little difference and any of the relatively harder waxes may be used. In addition to the waxes, it has also been found that polyethylene may be used to reduce surface friction. Although this is an elastomer, it has been found to impart excellent friction reducing properties to sound records moulded from these compositions and therefore is a preferred type of anti-frictioning agent.

Another ingredient, which, although not absolutely necessary in these compositions, improves their moulding properties to a considerable extent, is a plasticizer. Many different types can be used. These include orthonitrodiphenyl, orthoaminodiphenyl, ester types such as tricresyl phosphate, dibutyl or dioctyl phthalates, drying oils, etc.

In addition to the above type of ingredients, there may also be used various dyes and pigments, if desired. Oil soluble dyes are most suitable and powdered pigments such as carbon black can also be included.

Examples of preferred compositions falling within the scope of the present invention are as follows:

*Example 1*

| | Per cent |
|---|---|
| Polyvinyl acetate | 7.0 |
| Shellac | 5.0 |
| A resinous residue made by the process which comprises, (1) extracting pine wood with a coal tar hydrocarbon, (2) evaporating the coal tar hydrocarbon and other volatile constituents of the extract from the extract to produce a solid residue, (3) extracting rosin from said residue with a light petroleum hydrocarbon, (4) separating the rosin extract from the remaining residue which is substantially insoluble in light petroleum hydrocarbons, and (5) recovering the remaining resinous residue | 10.5 |
| Orthonitrodiphenyl | 1.0 |
| Ceranova wax | 0.5 |
| Carbon black | 1.5 |
| Zinc stearate | 0.5 |
| Filler | 74.0 |

*Example 2*

| | Per cent |
|---|---|
| Polyvinyl acetate | 12.0 |
| A resinous residue made by the process which comprises, (1) extracting pine wood with a coal tar hydrocarbon, (2) evaporating the coal tar hydrocarbon and other volatile constituents of the extract from the extract to produce a solid residue, (3) extracting rosin from said residue with a light petroleum hydrocarbon, (4) separating the rosin extract from the remaining residue which is substantially insoluble in light petroleum hydrocarbons, and (5) recovering the remaining resinous residue | 11.0 |
| Orthoaminodiphenyl | 1.0 |
| Polyethylene | 0.5 |
| Carbon black | 1.5 |
| Filler | 74.0 |

The polyvinyl acetate content of these compositions may vary between about 2 and about 20 percent by weight, the preferred amount being about 7 percent. When shellac is used at all its content is preferably not more than 12 percent. The other soft resinous ingredient which is highly fluid when molten is preferably used within a range of 8 to 15 percent. The plasticizer is usually used in amounts ranging from about 0.5 to about 3.0 percent. The anti-friction compound may vary from zero to about 2 percent, the preferred amount being 0.5 percent. Carbon black content may range from zero to about 3 percent, a preferred quantity being 1.5 percent. When other finely divided solid pigments are used, their percentage range is about the same. If an oil soluble dye is used instead, the quantities are usually more minute, the exact amount being determined by depth of color desired. The mould lubricant is usually present in amounts ranging from zero to 2 percent.

For general purpose moulding compositions in which relatively small amounts of plasticizer may be used, the percentage of filler may be as low as 45 percent. With more plasticizer, it may run as high as 80 percent. For record moulding compositions, however, the preferred range is 65–75 percent.

The amounts of the various ingredients stipulated above are to be regarded as approximate only and are to be followed if a superior product is desired. Obviously, amounts of each can be used outside the ranges specified but less satisfactory results will be obtained.

To make up the moulding compositions, the ingredients are powdered and dry-mixed, then charged into a Banbury mixer. Mixing time is from 2½ to 4½ minutes after fusion starts. The mixed materials are then dumped onto sheeter rolls and formed into sheets which can either be ground up to form a moulding powder or cut into blocks for moulding from a so-called "biscuit."

When used for moulding records, the "biscuit" may be preheated on a steam table at 140 pounds steam pressure. The heated biscuit is then placed in the stamping press and moulded under 1800–2000 pounds per square inch pressure for about 28 to 35 seconds. The temperature during the first part of the stamping operation rises to about 230°–260° F. The moulded product is rapidly cooled while still under pressure and is removed while at a temperature of 90°–100° F.

There have thus been described improved moulding compositions which may be used for making articles having good strength and flexibility. They have particular utility in the making of phonograph records but are by no means restricted to this use. They represent a distinct improvement over compositions containing shellac as the sole or principal resinous ingredient and make practical the use of the tougher more durable polyvinyl acetate since this material is unsatisfactory for record moulding when used alone.

We claim as our invention:

1. A phonograph record made up of a moulded composition in which the basic resinous ingredients consist of 2 to 20 percent polyvinyl acetate and 8 to 15 percent of another thermoplastic resinous material having a softening point of 75° to 170° C. which has the further characteristic of being highly fluid when molten, said another resinous material being at least one of the class consisting of shellac, rosin, rosin esters, hydrogenated rosin, wood tar pitches, coal tar pitches, asphalts, coumarone-indene resins, phenolic resins in the A stage, phenolic resins in the B stage, and the resinous residue made by the process which comprises, (1) extracting pine wood with a coal tar hydrocarbon, (2) evaporating the coal tar hydrocarbon and other volatile constituents of the extract from the extract to produce a solid residue, (3) extraction rosin from said residue with a light petroleum hydrocarbon, (4) separating the rosin extract from the remaining residue which is substantially insoluble in light petroleum hydrocarbons, and (5) recovering the remaining resinous residue, said composition also comprising 0.5 to 3.0 percent of a plasticizer and the remainder filler.

2. A phonograph record according to claim 1 including up to 2 percent of a hard wax.

3. A phonograph record according to claim 1 including 0.5 to 2 percent of polyethylene as a surface lubricant.

4. A phonograph record made up of a moulded composition comprising polyvinyl acetate—12.0 percent, the resinous residue made by the process which comprises, (1) extracting pine wood with a coal tar hydrocarbon, (2) evaporating the coal tar hydrocarbon and other volatile constituents of the extract from the extract to produce a solid residue, (3) extracting rosin from said residue with a light petroleum hydrocarbon, (4) separating the rosin extract from the remaining residue which is substantially insoluble in light petroleum hydrocarbons, and (5) recovering the remaining resinous residue—11.0 percent, a plasticizer—1.0 percent, polyethylene—0.5 percent, a pigment—1.5 percent and filler 74.0 percent.

5. A phonograph record according to claim 1 in which said another thermoplastic resinous material is the resinous residue made by the process which comprises, (1) extracting pine wood with a coal tar hydrocarbon, (2) evaporating the coal tar hydrocarbon and other volatile constituents of the extract from the extract to produce a solid residue, (3) extracting rosin from said residue with a light petroleum hydrocarbon, (4) separating the rosin extract from the remaining residue which is substantially insoluble in light petroleum hydrocarbons, and (5) recovering the remaining resinous residue.

WILLIAM P. MILLER.
STEPHEN D. RANSBURG.

REFERENCES CITED

The following references are of record in the file of this patent:

UNITED STATES PATENTS

| Number | Name | Date |
|---|---|---|
| 1,997,489 | Hermann et al. | Apr. 9, 1935 |
| 2,114,393 | Lane | Apr. 19, 1938 |
| 2,130,239 | Hunter | Sept. 13, 1938 |
| 2,153,553 | Fawcett | Apr. 11, 1939 |
| 2,206,636 | Hunter | July 2, 1940 |

OTHER REFERENCES

Advertisement of Monsanto Chemicals in Chemical and Metallurgical Engineering, April 1946, page 149.